United States Patent
Mao et al.

(10) Patent No.: US 11,269,100 B2
(45) Date of Patent: Mar. 8, 2022

(54) HYBRID OPTIMIZATION OF FAULT DETECTION AND INTERPRETATION

(71) Applicant: Landmark Graphics Corporation, Houston, TX (US)

(72) Inventors: Youli Mao, Houston, TX (US); Raja Vikram Pandya, Katy, TX (US); Bhaskar Mandapaka, Tomball, TX (US); Keshava Prasad Rangarajan, Sugar Land, TX (US); Srinath Madasu, Houston, TX (US); Satyam Priyadarshy, Katy, TX (US); Ashwani Dev, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 116 days.

(21) Appl. No.: 16/610,031

(22) PCT Filed: Dec. 21, 2017

(86) PCT No.: PCT/US2017/067987
§ 371 (c)(1),
(2) Date: Oct. 31, 2019

(87) PCT Pub. No.: WO2019/035858
PCT Pub. Date: Feb. 21, 2019

(65) Prior Publication Data
US 2020/0200931 A1    Jun. 25, 2020

Related U.S. Application Data

(60) Provisional application No. 62/547,615, filed on Aug. 18, 2017.

(51) Int. Cl.
*G01V 1/30* (2006.01)
*G01V 1/50* (2006.01)
(Continued)

(52) U.S. Cl.
CPC ............... *G01V 1/301* (2013.01); *G01V 1/50* (2013.01); *G06K 9/6228* (2013.01); *G06N 7/005* (2013.01);
(Continued)

(58) Field of Classification Search
CPC .... G01V 1/301; G01V 1/50; G01V 2210/642; G06N 20/10; G06N 7/005; G06K 9/6228
See application file for complete search history.

(56) References Cited

U.S. PATENT DOCUMENTS

| | | | |
|---|---|---|---|
| 2003/0223620 A1 | 2/2003 | Anxionnaz et al. | |
| 2008/0010047 A1* | 1/2008 | Graf | G01V 1/301 703/10 |

(Continued)

OTHER PUBLICATIONS

French Application Serial No. 1856616; Office Action; dated Feb. 11, 2019, 3 pages including English Summary.
(Continued)

*Primary Examiner* — Manuel L Barbee
(74) *Attorney, Agent, or Firm* — Gilliam IP PLLC

(57) ABSTRACT

A method includes receiving a training selection of a first set of faults located in a first subset of a seismic dataset for a subsurface geologic formation, detecting a second set of faults in the seismic dataset based on fault interpretation operations using a first set of interpretation parameters, and determining a difference between the first set of faults and the second set of faults. The method also includes generating a second set of interpretation parameters for the fault interpretation operations based on the difference between the first set of faults and the second set of faults, and determining a feature of the subsurface geologic formation based on fault interpretation operations using the second set of interpretation parameters.

20 Claims, 13 Drawing Sheets

(51) Int. Cl.
*G06K 9/62* (2006.01)
*G06N 7/00* (2006.01)
*G06N 20/00* (2019.01)

(52) U.S. Cl.
CPC ....... *G06N 20/00* (2019.01); *G01V 2210/642* (2013.01)

(56) References Cited

U.S. PATENT DOCUMENTS

| | | |
|---|---|---|
| 2010/0161232 A1 | 6/2010 | Chen et al. |
| 2011/0292764 A1 | 12/2011 | Kelly et al. |
| 2013/0158877 A1 | 6/2013 | Bakke et al. |
| 2015/0234070 A1 | 8/2015 | Xu et al. |
| 2017/0337302 A1* | 11/2017 | Mezghani ............... G06F 30/17 |

OTHER PUBLICATIONS

International Application No. PCT/US2017/067987, International Search Report dated May 15, 2018., 3 pages.
International Application No. PCT/US2017/067987, Written Opinion dated May 15, 2018, 9 pages.

\* cited by examiner

HYBRID OPTIMIZATION OF FAULT DETECTION AND INTERPRETATION

BACKGROUND

The disclosure generally relates to the field of subsurface geologic structure detection, and more particularly to subsurface geologic feature detection based on seismic data interpretation.

Interpretation of seismic data enhances understanding of features in a subsurface geologic formation (e.g., faults, fractures, etc.). These seismic interpretations can provide the position and shape of these subsurface geologic features. In turn, knowledge of the position and shape of these subsurface geologic features can increase hydrocarbon production during drilling. For example, drilling location, various drilling parameters, production parameters, drilling project characterization and ranking, etc. can be determined based on knowledge of the position and shape of these subsurface geologic features. By increasing the accuracy and speed of seismic interpretation through the use of fault interpretation (FI) algorithms, significant gains in efficiency, economy, and safety can be made.

The complexity of seismic data can demand FI algorithms that include many operations and depend on a substantial number of parameters. Moreover, some of these parameters may not be independent of each other, and the output from these FI algorithms can strongly depend on the choice of parameters in each operation. Additionally, these parameters can be data dependent. For example, the window size in semblance based fault interpretation algorithms can be quite different for land and marine seismic datasets. The practical use of an FI algorithm can involve parameter tuning. However, conventional parameter tuning methods can involve numerous optimization trials and recalculation in order to tailor the set of parameters to a particular dataset. These factors can make parameter tuning of an FI algorithm more time-consuming, mistake-prone, and result in inaccurate seismic interpretations.

BRIEF DESCRIPTION OF THE DRAWINGS

Embodiments of the disclosure can be better understood by referencing the accompanying drawings.

DESCRIPTION

Figure 1:
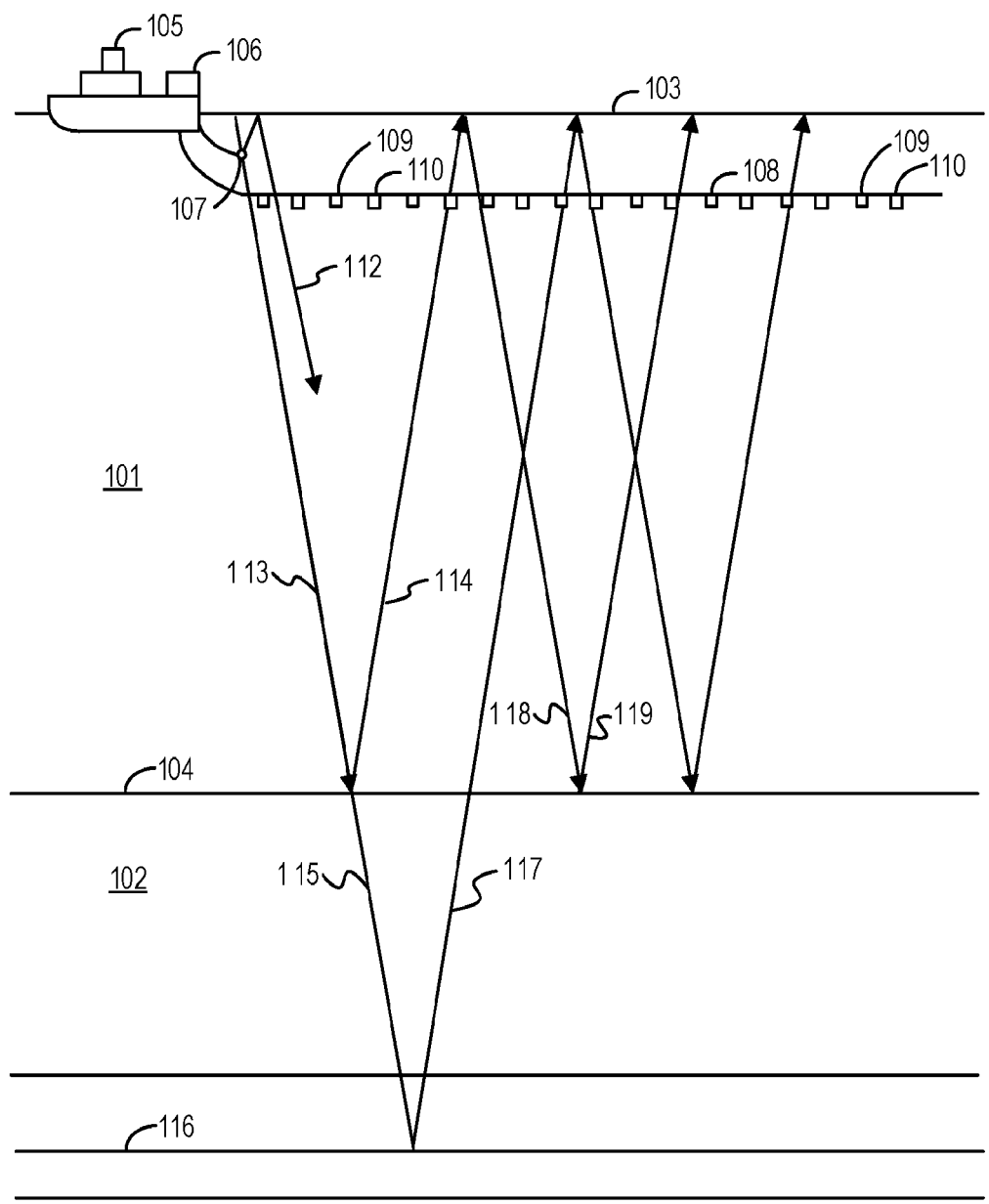
FIG. 1 depicts a schematic diagram of an elevation view of a typical marine seismic survey that can be used to provide seismic data, according to some embodiments.

The description that follows includes example systems, methods, techniques, and program flows that embody embodiments of the disclosure. However, it is understood that this disclosure can be practiced without these specific details. For instance, this disclosure refers to Euclidean norms as an objective in illustrative examples. Aspects of this disclosure can be instead applied to other mathematical norms, such as Manhattan norms, Minkowski norms, or relative Euclidean norms. In other instances, well-known instruction instances, protocols, structures and techniques have not been shown in detail in order not to obfuscate the description.

Various embodiments relate to optimized parameter tuning to speed up and increase the accuracy of operations to use seismic data to determine the position, orientation, and shape of formation features (e.g., fractures, faults, other physical discontinuities, etc.). Optimization methods for parameter tuning can be performed to reduce the time or computing resource costs to parameter tune a fault interpretation (FI) algorithm to determine optimized interpretation parameters for any number of FI algorithms. Interpretation parameters can include edge-preserving smoothing parameters (e.g. smooth strength $\alpha$, edge percentage $\beta$, planarity $\omega$, I sigma tensor, J sigma tensor, etc.), fault likelihood generation parameters (e.g. Attribute, I window, J window, S window, sigma dip, sigma strike, min-max dip, min-max strike, etc.), and/or parameters that reflect the state of the wellbore and/or formation. Accordingly, the resulting optimized FI algorithms can interpret formation features more accurately.

Seismic data can begin as an uninterpreted two-dimensional (2D) seismic dataset and/or three-dimensional (3D) seismic dataset. An expert labeling method and a FI algorithm can be used to label formation features on a training subset of the seismic dataset to generate an expert-labeled seismic dataset and a FI algorithm-labeled seismic dataset, respectively. The expert-labeled seismic dataset can represent a very small number of the total number of values in the seismic dataset (e.g., less than 1%). For example, an expert-labeled dataset can include 10 or fewer 2D seismic inline or crossline datasets to optimize seismic data for a large 3D seismic volume made of 100,000 inline and crossline 2D datasets. The expert-labeled dataset can be used to define an objective function in the optimization process. An objective function result can be generated based on one or more quantified differences between the expert-labeled seismic dataset and the FI algorithm-labeled seismic dataset. The interpretation parameters used by the FI algorithm can be updated using a stochastic optimization method such as Bayesian Optimization, which is suitable for optimizing algorithms with a large number of parameters and can perform fast tuning for real time applications. By using an optimization technique such as Bayesian Optimization, the interpretation parameters can be updated for each sample of the training subset. This optimization technique allows the efficient and automated determination of optimal interpretation parameters. Once the updated parameters are determined to be optimal, the updated parameters can be used in the FI algorithm to determine formation properties and generate predicted formation features. The FI algorithm with optimized interpretation parameters can then be applied for uninterpreted seismic dataset to provide high-quality seismic interpretation results. Use of the FI algorithm with optimized interpretation parameters can also reduce the total time to interpret a seismic dataset. For example, the time required to interpret a 3×3×3 mile seismic can be reduced from 1 month to 2 days.

In some embodiments, the seismic interpretation results can be used to modify an operational parameter during a wellbore operation such as during drilling, wireline logging, well stimulation treatment, etc. An operational parameter can be any controllable parameter used to start, change, or stop a wellbore operation. For example, the locations of faults can be used to determine a drilling plan to ensure that drilling does not drill into a fault. In some embodiments, the location of the fault can be incorporated into a drilling control system to prevent drilling near a boundary close to the fault line. The location of faults can also be used to determine the parameters of a stimulation treatment so that stimulation would not damage or perforate geologic media in the vicinity of a fault. Additionally, the location of faults can determine zones of a wellbore at which the motion of a well tool should be slowed or stopped.

Example Seismic Data Acquisition System

FIG. 1 depicts a schematic diagram of an elevation view of a typical marine seismic survey that can be used to provide seismic data, according to some embodiments. A body of water 101 over the earth 102 is bounded at the water surface 103 by a water-air interface and at the water bottom 104 by a water-earth interface. Beneath the water bottom 104, the earth 102 contains subterranean formations of interest. A seismic vessel 105 travels on the water surface 103 and contains seismic acquisition control equipment, designated generally as 106. The seismic acquisition control equipment 106 includes navigation control, seismic source control, seismic sensor control, and recording equipment.

The seismic acquisition control equipment 106 causes a seismic source 107 towed in the body of water 101 by the seismic vessel 105 to actuate at selected times. Seismic streamers 108 contain sensors to detect the reflected wavefields initiated by the seismic source 107 and reflected from interfaces in the environment. The seismic streamers 108 can contain pressure sensors such as hydrophones 109 and/or water particle motion sensors such as geophones 110. The hydrophones 109 and geophones 110 are typically co-located in pairs or pairs of sensor arrays at regular intervals along the seismic streamers 108.

The seismic source 107 is activated at periodic intervals to emit acoustic waves in the vicinity of the seismic streamers 108 with its hydrophones 109 and geophones 110. Each time the seismic source 107 is actuated, an acoustic wavefield 112 travels upwardly or downwardly in spherically expanding wave fronts. The traveling wavefields will be illustrated by ray paths normal to the expanding wave fronts. The downwardly traveling wavefield from the seismic source 107, in ray path 113, will reflect off the earth-water interface at the water bottom 104 and then travel upwardly, as in ray path 114, where the wavefield can be detected by the hydrophones 109 and geophones 110. The upwardly traveling wavefield 114 will reflect off the water surface 103 and continue to reflect off the earth-water interface at the water bottom and the water surface 103, as in ray path 118 and ray path 119. Such a reflection at the water bottom 104, as in ray path 114, contains information about the water bottom 104 and hence can be retained for further processing. Additionally, the downwardly traveling wavefield, as in ray path 113, can transmit through the water bottom 104 as in ray path 115, reflect off a layer boundary, such as 116, and then travel upwardly, as in ray path 117. The upwardly traveling wavefield, ray path 117, can then be detected by the hydrophones 109 and geophones 110. Such a reflection off a layer boundary 116 can contain useful information about subterranean formations and is also an example of a primary reflection, having one reflection in the subterranean earth In some embodiments, the information about subterranean formations can be stored as multidimensional seismic datasets with one or more values corresponding with spatial coordinates. Values in the seismic datasets can correspond with a specific spatial unit, and each of the spatial units can be visually represented. For example, the spatial unit of a 2D seismic dataset can be represented as a pixel and the spatial unit of a 3D seismic dataset can be represented as a voxel.

Figure 2:
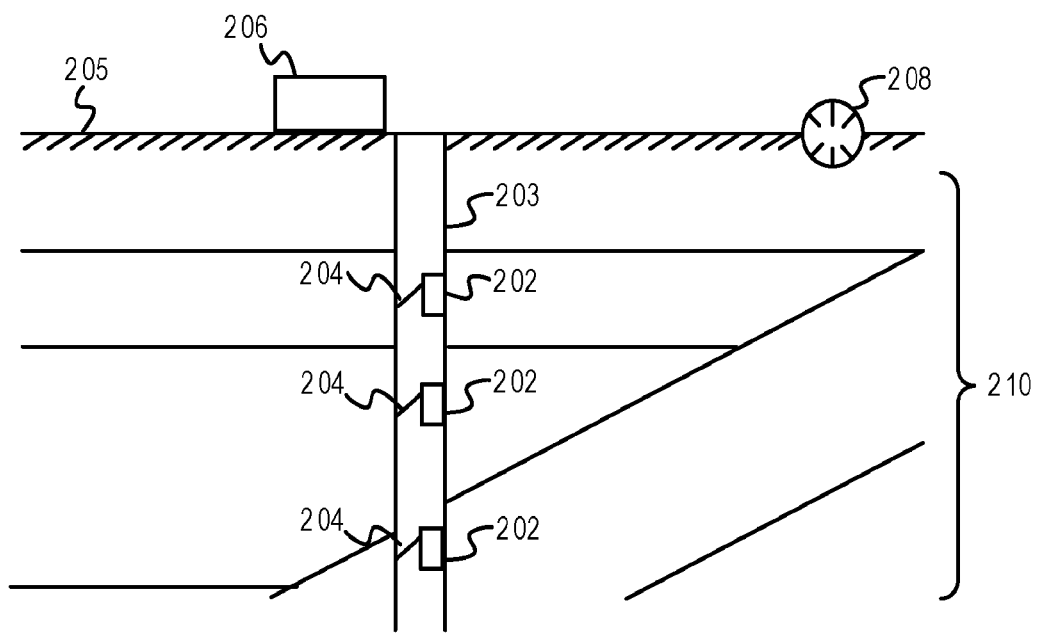
FIG. 2 depicts a schematic diagram of an onshore borehole seismic survey environment, according to some embodiments.

FIG. 2 depicts a schematic diagram of an onshore borehole seismic survey environment, according to some embodiments. Seismic receivers 202 are in a spaced-apart arrangement within a borehole 203 to detect seismic waves. As shown, the seismic receivers 202 can be fixed in place by anchors 204 to facilitate sensing seismic waves. In different embodiments, the seismic receivers 202 can be part of a logging-while-drilling (LWD) tool string or wireline logging tool string. Further, the seismic receivers 202 communicate wirelessly or via cable to a data acquisition unit 206 at the surface 205, where the data acquisition unit 206 receives, processes, and stores seismic signal data collected by the seismic receivers 202. To generate seismic signal data, surveyors trigger a seismic energy source 208 at one or more positions to generate seismic energy waves that propagate through the earth 210. Such waves reflect from acoustic impedance discontinuities to reach the seismic receivers 202. Illustrative discontinuities include fractures, faults, boundaries between formation beds, and boundaries between formation fluids. The discontinuities can appear as bright spots in the subsurface structure representation that is derived from the seismic signal data. The seismic signal data and subsurface structure representation can be individually or collectively stored as a seismic dataset.

Example Operations

Figure 3:
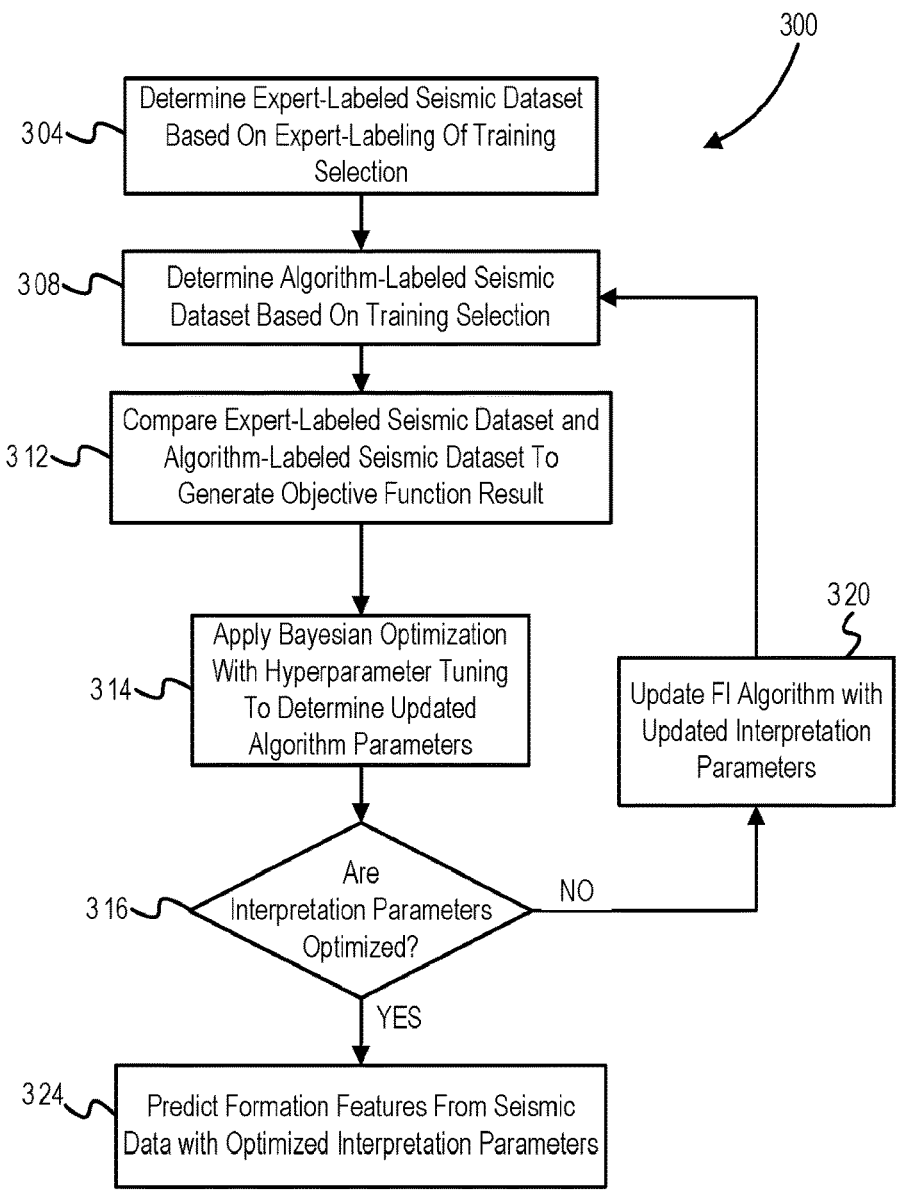
FIG. 3 depicts a flowchart of operations for optimizing the parameters of a fault interpretation algorithm, according to some embodiments.

FIG. 3 depicts a flowchart of operations for optimizing the parameters of a fault interpretation algorithm, according to some embodiments. Operations of the flowchart 300 begin at block 304.

At block 304, an expert-labeled seismic dataset is determined based on a training selection (e.g., a training seismic dataset). In some embodiments, the training selection can be acquired by seismic equipment, generated by simulations, retrieved from a database, etc. In some embodiments, the expert-labeled seismic dataset can be generated based on the training selection using a human expert to label the seismic dataset. For example, a human expert can determine discrepancies in the bands of a seismic dataset and either manually or digitally label a set of faults in the seismic dataset. Alternatively, the expert-labeled seismic dataset can be generated using a computer-based system such as a computer vision or machine-learning system. For example, a computer-based system can assign a probability value to each spatial unit of a seismic dataset, wherein a spatial unit is a 2D or 3D representation of physical space. The computer-based system can set a boolean value for each spatial unit of an expert-labeled seismic dataset can be set to "not fault/fracture" if the spatial unit corresponds with having less than a 50% probability, and set to "is fault/fracture" otherwise.

At block 308, an algorithm-labeled seismic dataset is determined based on the training selection. The algorithm-labeled seismic dataset can be determined using a FI algorithm. In some embodiments, a FI algorithm can be a semblance algorithm with a plurality of steps and interpretation parameters that can affect the predicted location and trajectory of faults/fractures in a fault interpretation. In some embodiments, a FI algorithm can be applied onto 2D datasets. In some embodiments, application of the FI algorithm onto 2D datasets can be used to generate 3D datasets. For example, an uninterpreted 3D seismic dataset can represent a 3D volume that can be split into a set of 2D seismic datasets. The FI algorithm can be applied onto each of the set of 2D seismic datasets to generate a set of FI algorithm-labeled 2D datasets that can be combined to construct a 3D seismic dataset with fractures, faults, and other discontinuities. In some embodiments, error and bias can be reduced by using multiple 2D seismic datasets as training selections from the same 3D seismic dataset in both inline and crossline directions (i.e., a direction parallel to deployed receiver cables used for seismic measurement and a direction perpendicular to the deployed receiver cables used for measurement, respectively). Alternatively, a facet-determining algorithm can be used on a 3D seismic dataset to determine 3D algorithm-labeled seismic datasets, or a voxel-based FI algorithm can be used on a 3D voxel-based dataset to determine 3D algorithm-labeled seismic datasets.

The FI algorithm to determine a fault likelihood can include 1, 5, 30, or more interpretation parameters. Binary values of the 2D FI algorithm-labeled seismic datasets can be set to zero (representing that a spatial unit is not a fracture) if they correspond with a spatial unit that is labeled as having less than a 50% probability of representing a fault/fracture by the expert-labeled 2D seismic dataset. The binary values of the 2D FI algorithm-labeled binary dataset are set to one otherwise. A 2D FI algorithm-labeled seismic dataset can be simplified to a FI algorithm-labeled 2D binary array including binary values, wherein each value is assigned to a specific spatial unit of the FI algorithm-labeled 2D seismic dataset.

At block 312, the expert-labeled seismic dataset is compared with the algorithm-labeled seismic dataset to generate an objective function result. The objective function result can be generated by comparing a property assigned to each spatial unit of the expert-labeled seismic dataset and the algorithm-labeled seismic dataset. The objective function can be determined using a mathematical norm such as a Euclidean norm. For example, in a 2D seismic dataset, a Euclidean norm can be taken between its expert-labeled binary value and its FI algorithm-labeled binary value for each spatial unit of a 2D seismic dataset. For a seismic dataset using binary values to represent a seismic dataset, the Euclidean norm can be determined by first taking the difference between the two binary values. A normalized difference can then be determined. For instance, the normalized difference can be determined by dividing the difference by the total number of spatial units. The Euclidean norm between the expert-labeled binary value and the FI algorithm-labeled binary value can then be determined by taking a root mean square of the normalized difference. A difference between two seismic datasets can be based on the total Euclidean norm generated by summing the Euclidean norms of each spatial unit for a pair of 2D seismic datasets. The difference between the expert-labeled 2D seismic dataset (with the expert-labeled set of faults) and the FI algorithm-labeled 2D seismic dataset (with the algorithm-labeled set of faults) can be used as an objective function result.

In some embodiments, non-binary values can be used to generate the objective function result. For example, a probability value between zero and one can be assigned to each spatial unit of an expert-labeled seismic dataset and a FI algorithm-labeled seismic dataset. A Euclidean norm between the pair of seismic datasets can be generated based on the probability differences between the spatial units of the expert-labeled seismic dataset with the expert-labeled set of faults and the corresponding spatial unit of the FI algorithm-labeled seismic dataset with the algorithm-labeled set of faults. In some embodiments, other norms instead of Euclidean norms can be used, such as Manhattan norms and Minkowski norms.

At block 314, Bayesian optimization with hyperparameter tuning is applied to determine updated interpretation parameters. Bayesian optimization can explore and exploit strategies to arrive at optimum parameters' values in a constrained domain. The constraints of each parameter domain can be determined on a parameter-by-parameter basis, such as being determined by mathematical probability (e.g. a probability between 0 and 1) or expert knowledge (e.g. allowing a parameter to vary between 100 kilopascals and 250 megapascals). An updated value for some, all, or none of the 1, 5, 30, or more interpretation parameters can be generated by the optimization operation. In some embodiments, the operations described for block 314 can instead occur at block 320, further described below.

The operations described for blocks 304-312 can be used for a plurality of datasets. In some embodiments, the above operation can be performed on each face of a cubic 3D seismic dataset. For example, the above operation can be performed on four inline and crossline seismic shots of a cubic 3D seismic dataset and one or more seismic shots inside of the cubic 3D seismic dataset. Alternatively, the above operation can be performed on any number of orthogonal or non-orthogonal slices of a 3D seismic dataset. In other embodiments, the above operations can be performed on voxel subsections of a 3D seismic dataset.

At block 316, a determination is made of whether the interpretation parameters are optimized. In some embodiments, the determination is made based on whether an objective function is less than or equal to an objective threshold, wherein an objective function is minimized when two identical images are compared. For example, if an objective function results in a value of 0.1 and the objective threshold is 0.11, then the parameters can be determined to be optimized. Alternatively, the parameters can be determined to be optimized when an objective function cannot be minimized after an optimization step threshold have been performed without meeting an objective function decrease threshold. For example, if an optimization step threshold is 1000 and the objective function decrease threshold is 1%, then if 1001 optimization steps have been performed with less than a 1% decrease in the objective function, then a determination that the parameters are optimized can be made. If the parameters are not determined to be optimized, the operations of the flowchart 300 proceed to block 320. Otherwise, operations of the flowchart 300 proceed to block 324.

At block 320, the FI algorithm is updated with the updated interpretation parameters. In some embodiments, the updated interpretation parameters determined by an optimization method such as the Bayesian optimization operation described for block 314 can be used to update the interpretation parameters. For example, if edge percentage is an interpretation parameter and has been updated from a value of 0.40 to a value of 0.45, the value of 0.45 can be used for edge percentage during the next iteration of determining an algorithm-labeled seismic dataset. These updated interpretation parameters can be used during a next iteration of the operations described for block 308. In some embodiments, the optimization operation described for block 314 can be performed at block 320.

At block 324, formation features from seismic data can be predicted using the optimized fault interpretation algorithm. Once optimized parameters are established, the FI algorithm with optimized parameters can be used to determine FI algorithm-labeled seismic datasets for a plurality of seismic datasets and optimize the fault likelihood prediction accuracy. In some embodiments, the FI algorithm can be applied onto a set of 2D seismic datasets that can be stacked, sliced, or otherwise combined to form a 3D seismic dataset, and the positions and orientation of formation features as determined by the FI algorithm can be determined. For example, 3D seismic datasets can be constructed from stacked 2D seismic datasets. By running the parameter optimization workflow on a training subset of the 2D seismic datasets, optimized FI parameters can be determined. The optimized FI parameters can then be used to determine the formation features of the entire 3D seismic dataset. In some embodiments, the FI parameters of each set of the training subset can be averaged. Alternatively, the FI parameters of each subset can be established within a 2D or 3D range near its corresponding sample of the training subset, and an averaging or smoothing algorithm can be used to reduce noise, imaging artifacts and improperly interpreted discontinuities.

Example Data

Figure 4:
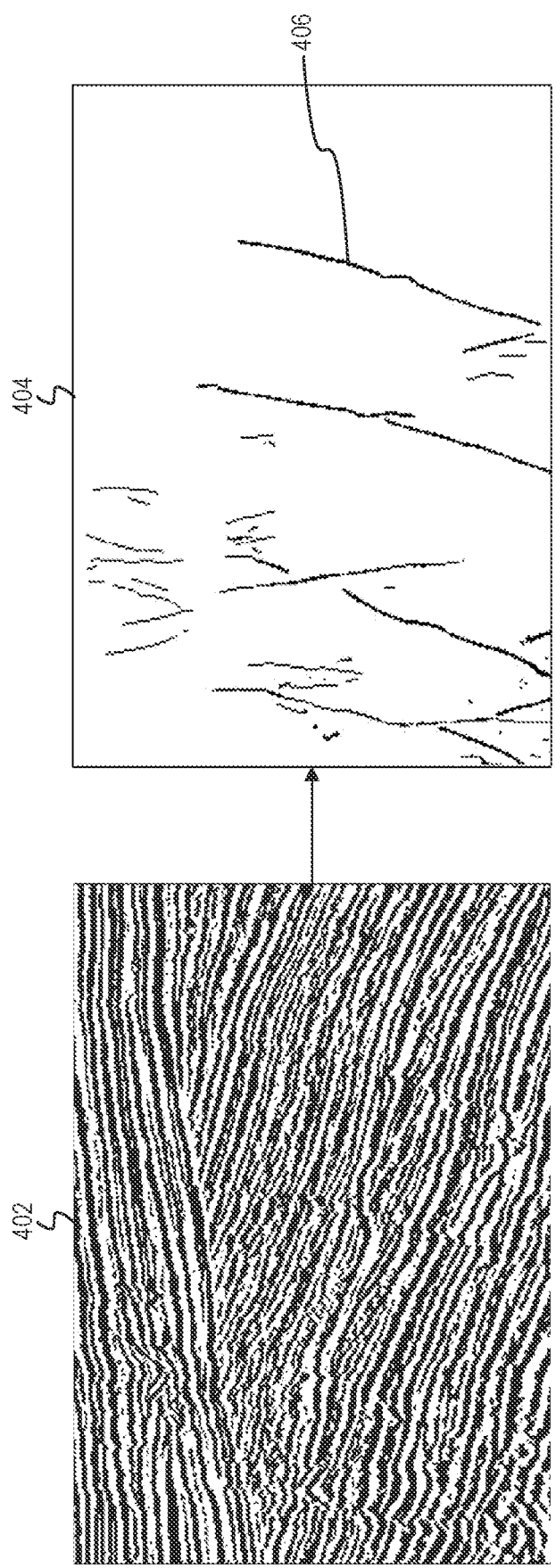
FIG. 4 depicts an example unlabeled seismic dataset and corresponding expert-labeled seismic dataset, according to some embodiments.

FIG. 4 depicts an example unlabeled seismic dataset and corresponding expert-labeled seismic dataset, according to some embodiments. The unlabeled seismic dataset 402 is processed by a seismic interpretation expert to generate the expert-labeled seismic dataset 404. For example, with reference to FIG. 3, the expert-labeled seismic dataset 404 can be generated using an operation similar to or identical to the operations described for block 304. Each line of the expert-labeled seismic dataset 404 represents a formation feature such as a fracture or fault. The expert-labeled seismic dataset 404 can act as a training dataset to parameter tune an FI algorithm.

Figure 5:
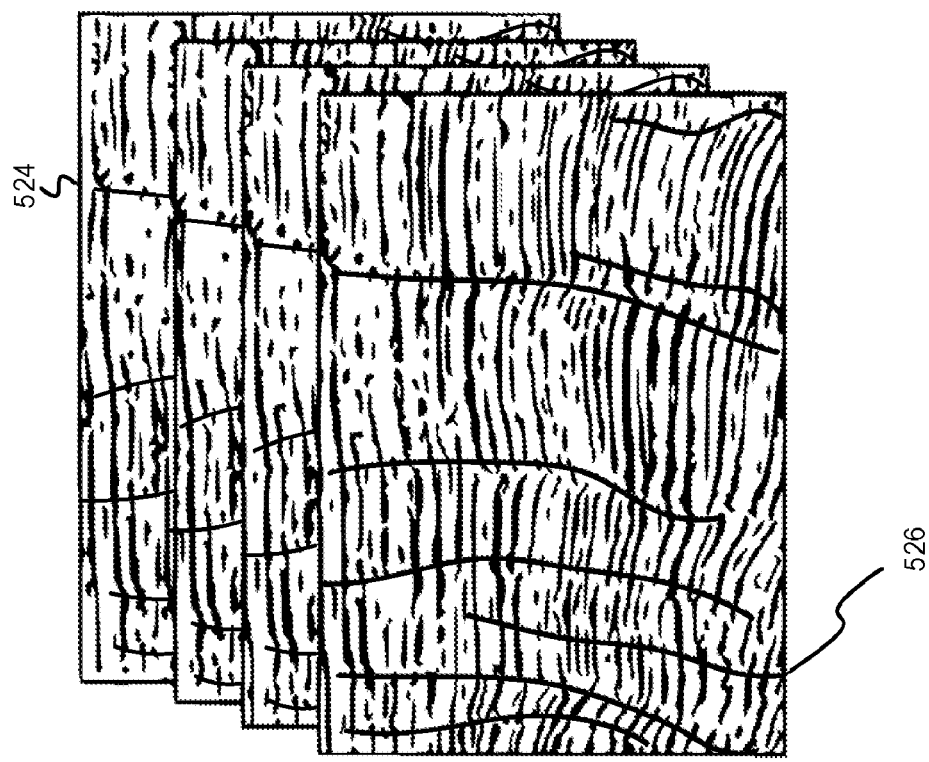
FIG. 5 depicts an example uninterpreted seismic dataset and example fault interpretation algorithm-labeled seismic dataset, according to some embodiments.
Figure 5:
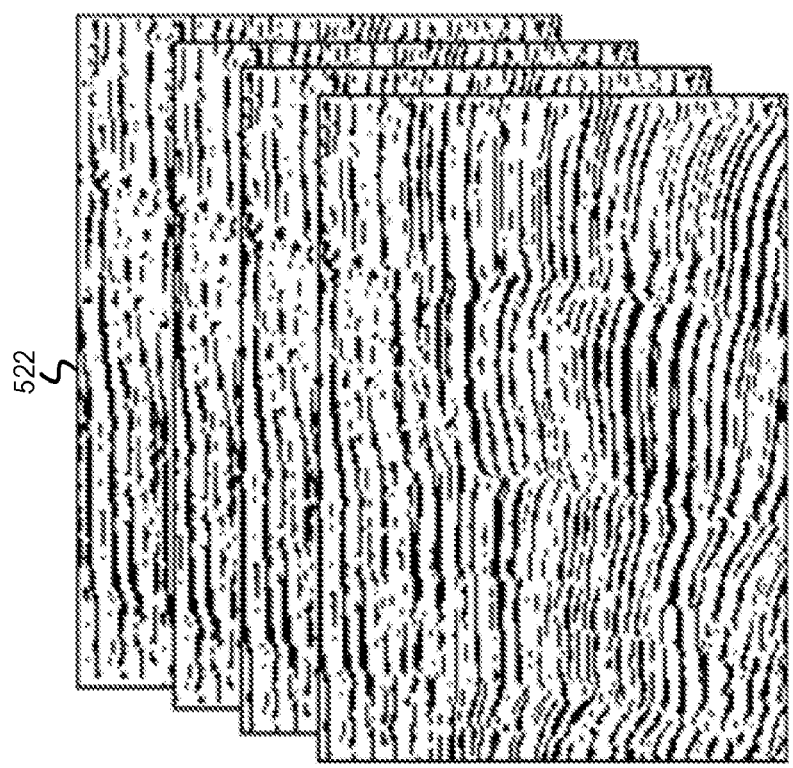

FIG. 5 depicts an example uninterpreted seismic dataset and example fault interpretation algorithm-labeled seismic dataset, according to some embodiments. A FI algorithm can be used to determine the shape and position of the predicted formation features in an FI algorithm-labeled seismic dataset 524 based on the uninterpreted seismic dataset 522. In some embodiments, with reference to FIG. 3, the FI algorithm-labeled seismic dataset 524 can be generated using an operation similar to or identical to the operations described for block 308. The 2D datasets of the FI algorithm-labeled seismic dataset 524 can be combined to form a 3D algorithm-labeled seismic dataset, wherein formation features such as the fault 526 can be combined with formation features in other 2D algorithm-labeled seismic datasets to form a 3D fault in the 3D algorithm-labeled seismic dataset.

Figure 6:
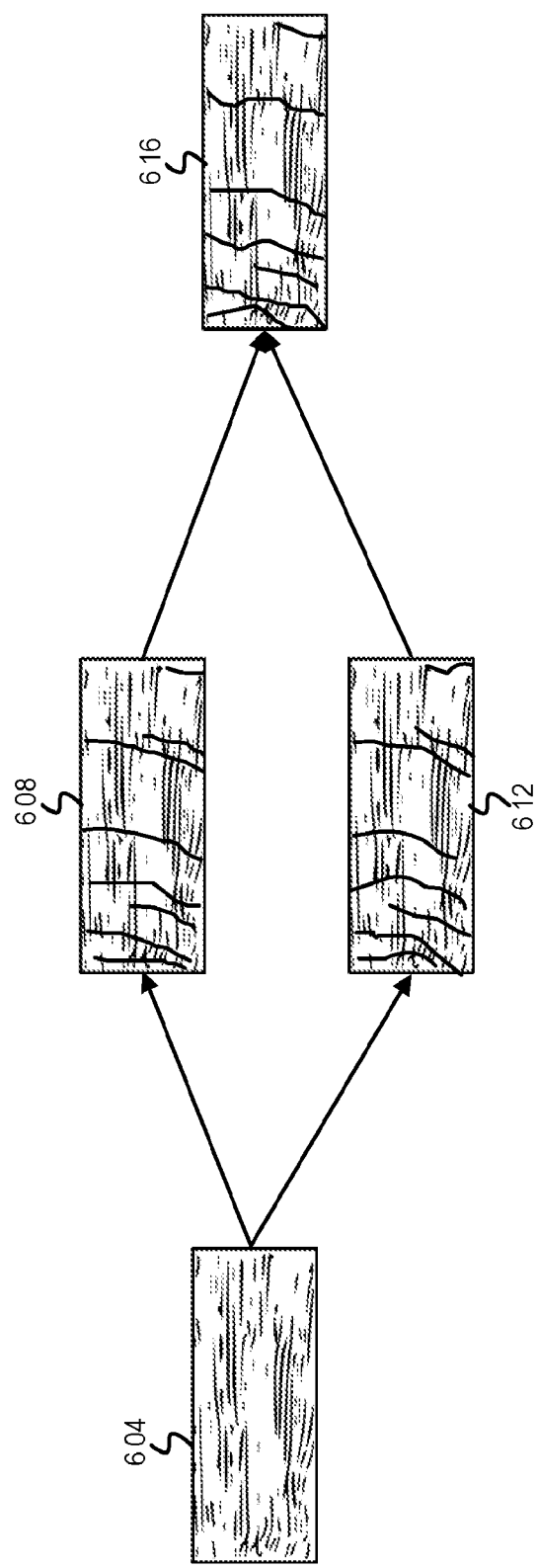
FIG. 6 depicts an example representation of interpreted seismic datasets during an optimization of a fault interpretation algorithm, according to some embodiments.

FIG. 6 depicts representations of interpreted seismic datasets during an optimization of a fault interpretation algorithm, according to some embodiments. The uninterpreted seismic dataset 604 can be collected from sensors or acquired from a database. With reference to FIG. 3, the expert-labeled seismic dataset 608 can be generated using operations similar or identical to those described for block 304. With reference to FIG. 3, the algorithm-labeled seismic dataset 612 can be generated using operations similar or identical to those described for block 308. In one iteration of the FI algorithm optimization process, the expert-labeled seismic dataset 608 and the algorithm-labeled seismic dataset 612 can be compared and used to optimize the parameters of the FI algorithm. Once optimized, the FI algorithm can be used to generate the optimized algorithm-labeled seismic dataset 616. For example, with reference to FIG. 3, the optimized algorithm-labeled seismic dataset 616 can be generated using operations similar or identical to those described for block 324.

Figure 7:
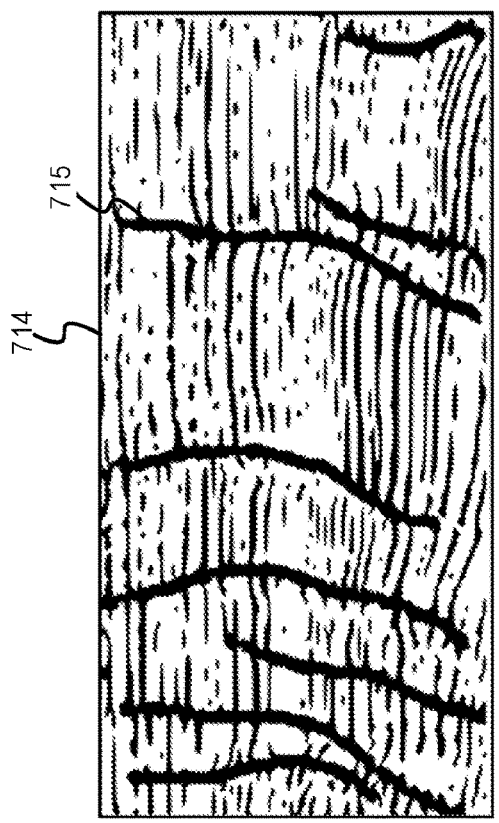
FIG. 7 depicts a first example expert-interpreted seismic dataset and algorithm-labeled seismic dataset, according to some embodiments.
Figure 7:
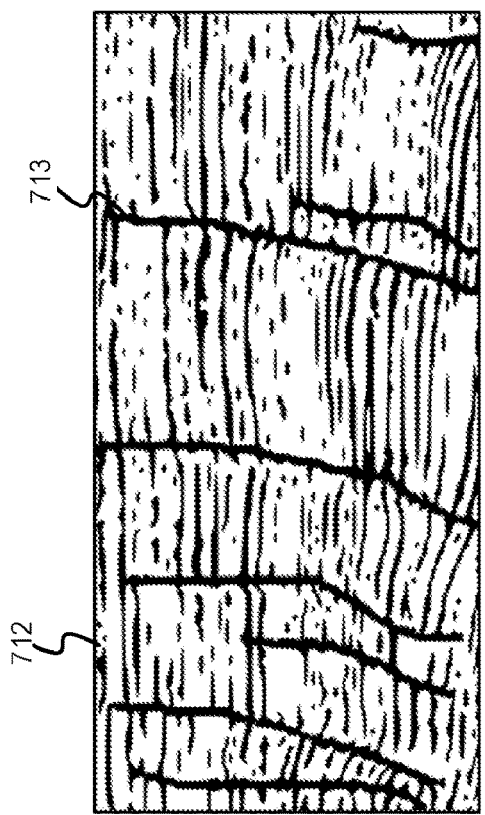

FIG. 7 depicts a first example expert-interpreted seismic dataset and algorithm-labeled seismic dataset, according to some embodiments. The expert-labeled seismic dataset 712 can be processed to show both the original discontinuities from the seismic source data and the predicted formation features, such as the fault 713 in the expert-labeled seismic dataset 712 and the fault 715 in the algorithm-labeled seismic dataset 714. The predicted faults of the expert-labeled seismic dataset 712 can be compared with the algorithm-labeled seismic dataset 714 to determine how similar the predicted faults are. With reference to FIG. 3, the expert-labeled seismic dataset 712 and algorithm-labeled seismic dataset 714 can be compared using an operation similar or identical to that described for block 312.

Figure 8:
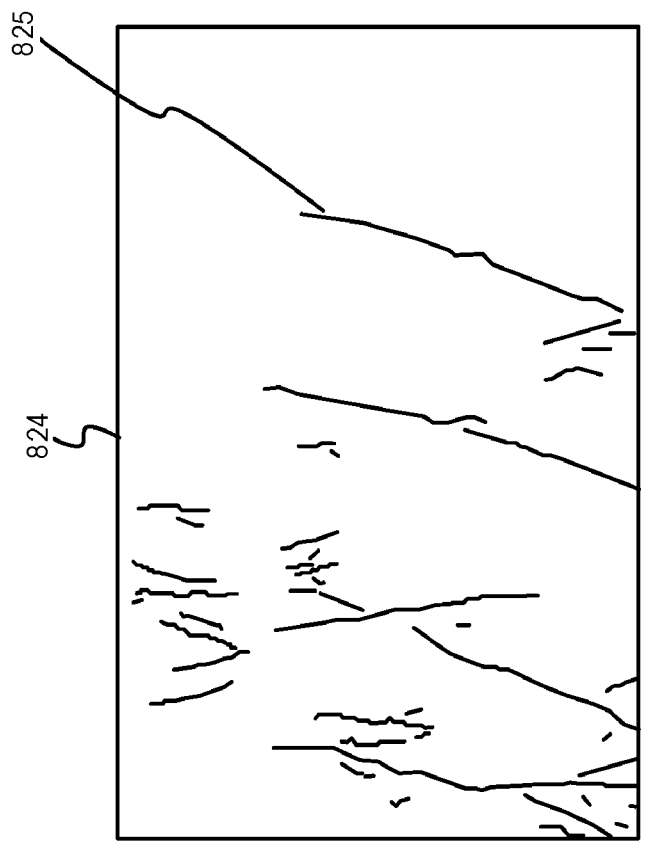
FIG. 8 depicts a second example expert-interpreted seismic dataset and algorithm-labeled seismic dataset, according to some embodiments.
Figure 8:
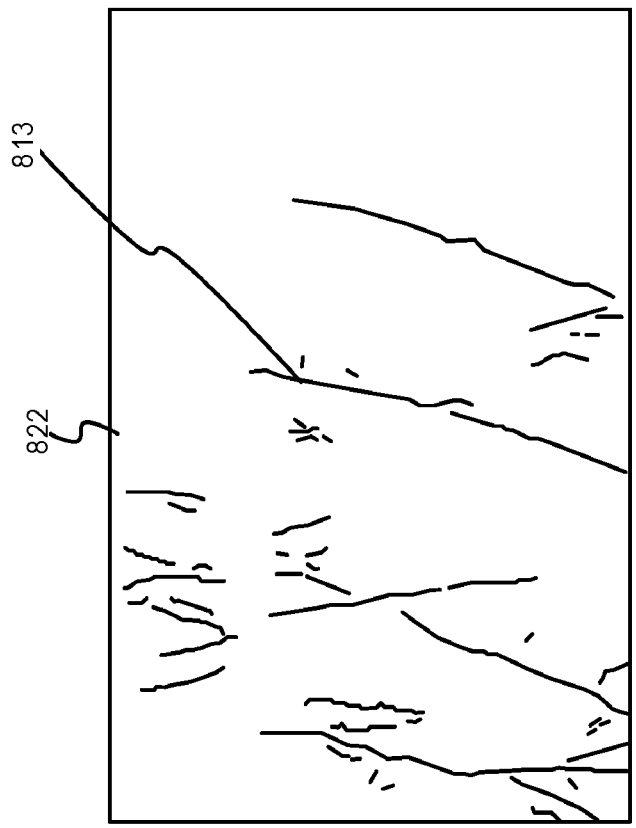

FIG. 8 depicts a second example expert-interpreted seismic dataset and algorithm-labeled seismic dataset, according to some embodiments. The expert-labeled seismic dataset 822 can be processed with an optimized FI algorithm to generate the optimized FI algorithm-labeled seismic dataset 824. The datasets have been processed to show only the faults, such as the fault 813 in the expert-labeled seismic dataset 822 and the fault 825 in the optimized FI algorithm-labeled seismic dataset 824. An optimized FI algorithm can be used to generate an optimized FI algorithm-labeled seismic dataset 824. In some embodiments, the parameters of the optimized FI algorithm can be optimized to reduce the per-spatial unit difference between the expert-labeled seismic dataset and the algorithm-labeled seismic dataset. For example, the difference between the optimized FI algorithm-labeled seismic dataset 824 and its corresponding expert-labeled dataset 822 is less than 8%. In other embodiments, the algorithm-labeled seismic dataset can be optimized to reduce the per-spatial unit difference between the expert-labeled seismic dataset and the algorithm-labeled seismic dataset to be less than 10%, less than 5%, or less than 1%.

Figure 9:
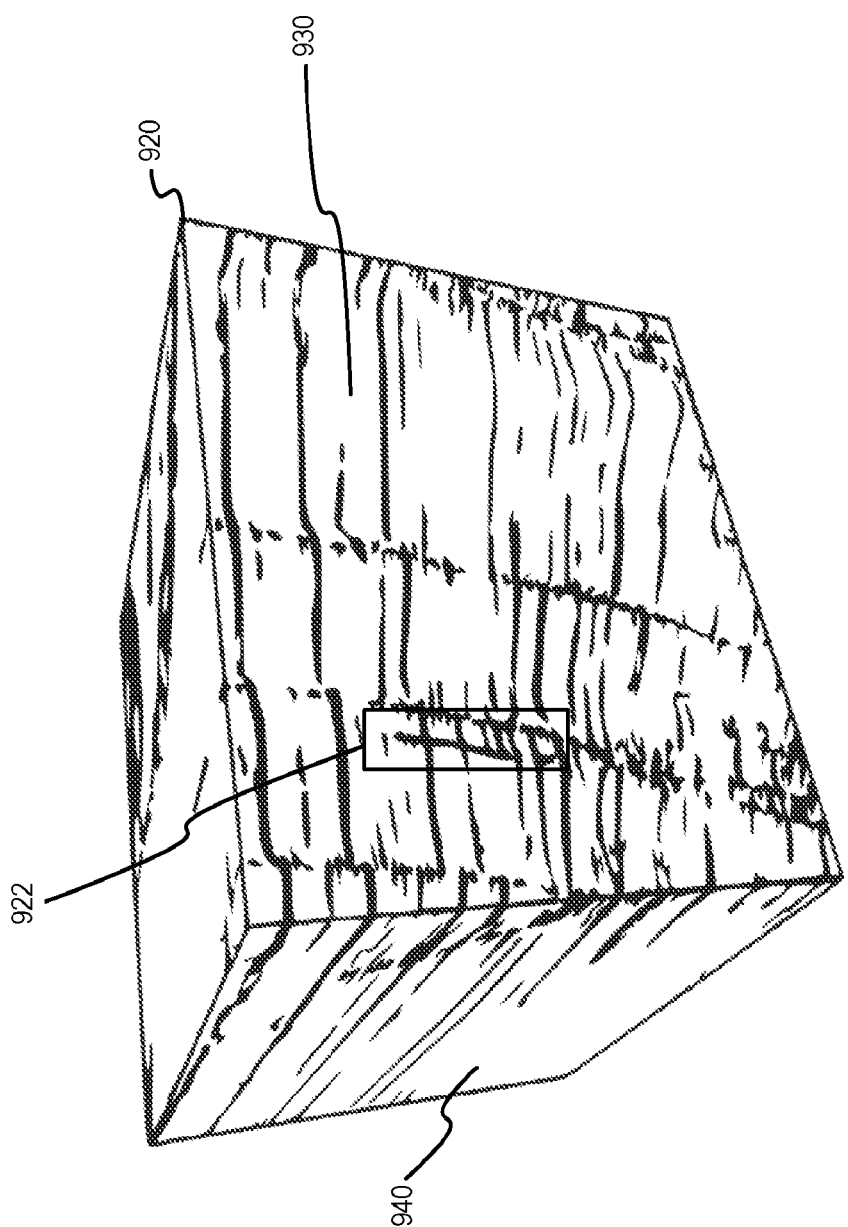
FIG. 9 depicts a three-dimensional fault interpretation dataset, according to some embodiments.

FIG. 9 depicts a three-dimensional fault interpretation dataset, according to some embodiments. An optimized FI-algorithm can generate the 3D seismic dataset 920, wherein the 3D seismic dataset 920 shows predicted formation features such as the fault 922. In some embodiments, the parameters can be optimized based on multiple inline and crossline datasets of the 3D seismic dataset to use to parameter tune the FI algorithm. For example, the 3D seismic dataset 920 can be split into a set of 2D datasets coplanar with the inline cubic face 930 and a second set of 2D datasets coplanar with the crossline cubic face 940. The optimized FI-algorithm can identify discontinuities and/or discontinuity likelihoods for each spatial unit of each of the 2D datasets that are coplanar with either the inline cubic face 930 or crossline cubic face 940. Each 2D dataset can be recombined to reconstruct the 3D seismic dataset 920 to include the identified discontinuities, and an averaging method or prioritization method can be used to reconcile non-identical values.

Example Drilling System

Figure 10:
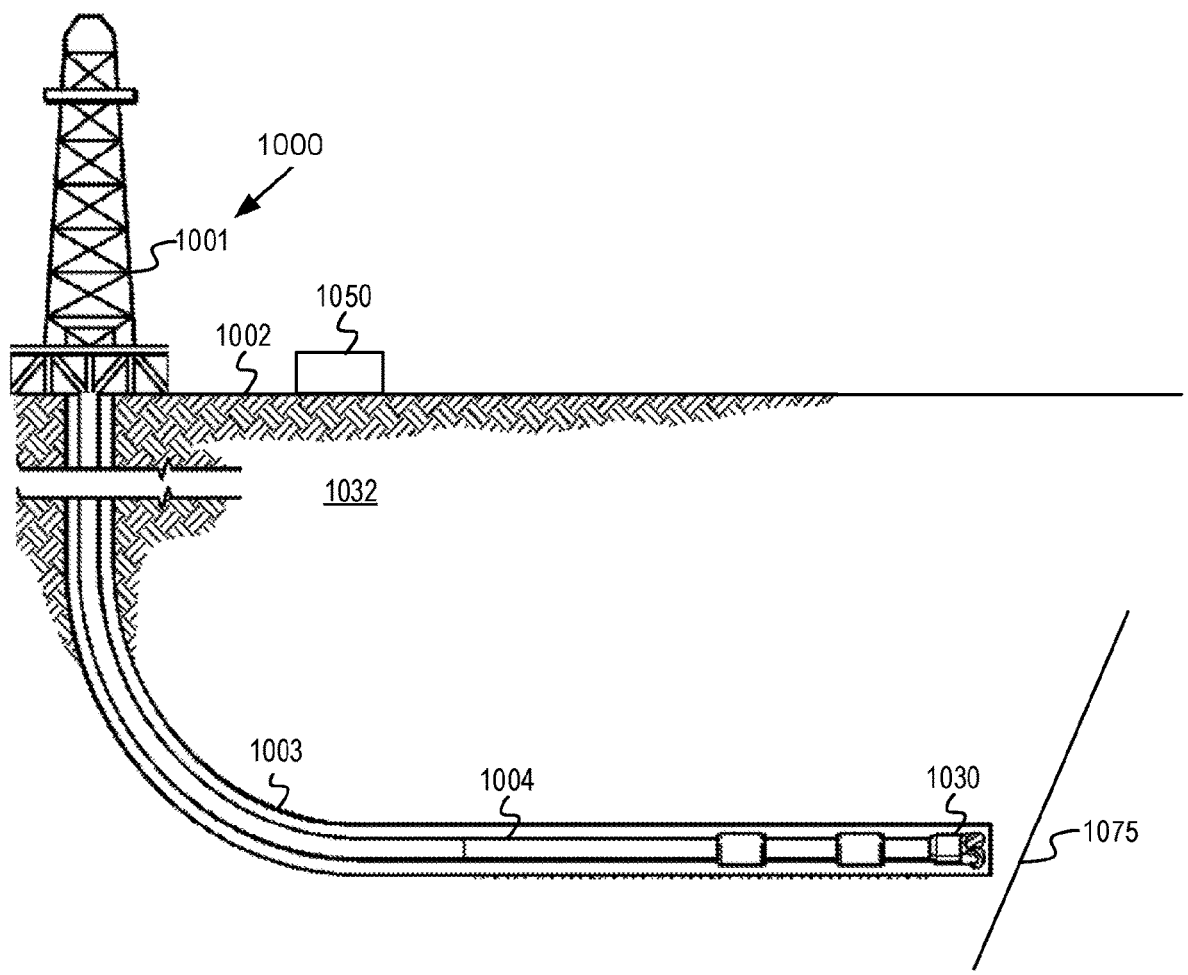
FIG. 10 depicts an example drilling system near a fault, according to some embodiments.

FIG. 10 depicts an example drilling system near a fault, according to some embodiments. FIG. 10 depicts a drilling system 1000. The drilling system 1000 includes a drilling rig 1001 located at the surface 1002 of a borehole 1003. The initial location of the borehole 1003 and various operational parameters for drilling (e.g. drilling speed, weight on bit, drilling fluid pump rate, drilling direction, drilling fluid composition) can be selected based on seismic interpretation results (as described above). For example, location of the borehole 1003 can be selected to avoid faults identified in the operations described above. The drill string 1004 can be operated for drilling the borehole 1003 through the subsurface formation 1032 with the bottomhole assembly (BHA).

The BHA includes a drill bit 1030 at the downhole end of the drill string 1004. The drill bit is in the vicinity of fault 1075, wherein the position of fault 1075 is determined based on a predicted formation feature from a FI algorithm-labeled seismic dataset. The BHA and the drill bit 1030 can be coupled to computing system 1050, which can operate the drill bit 1030 as well as received data based on the sensors attached to the BHA. The drill bit 1030 can be operated to create the borehole 1003 by penetrating the surface 1002 and subsurface formation 1032. In some embodiments, a drilling plan can call for the drill bit 1030 to stop drilling when within a range of the fault 1075. By increasing the accuracy of the seismic interpretation results, the drill bit 1030 can more safely and easily avoid penetrating through the fault 1075. For example, sensors on the BHA can transmit a signal to the computing system 1050 that the drill bit is near a fault, and the computing system can stop the drill bit 1030.

Example Wellbore System

Figure 11:
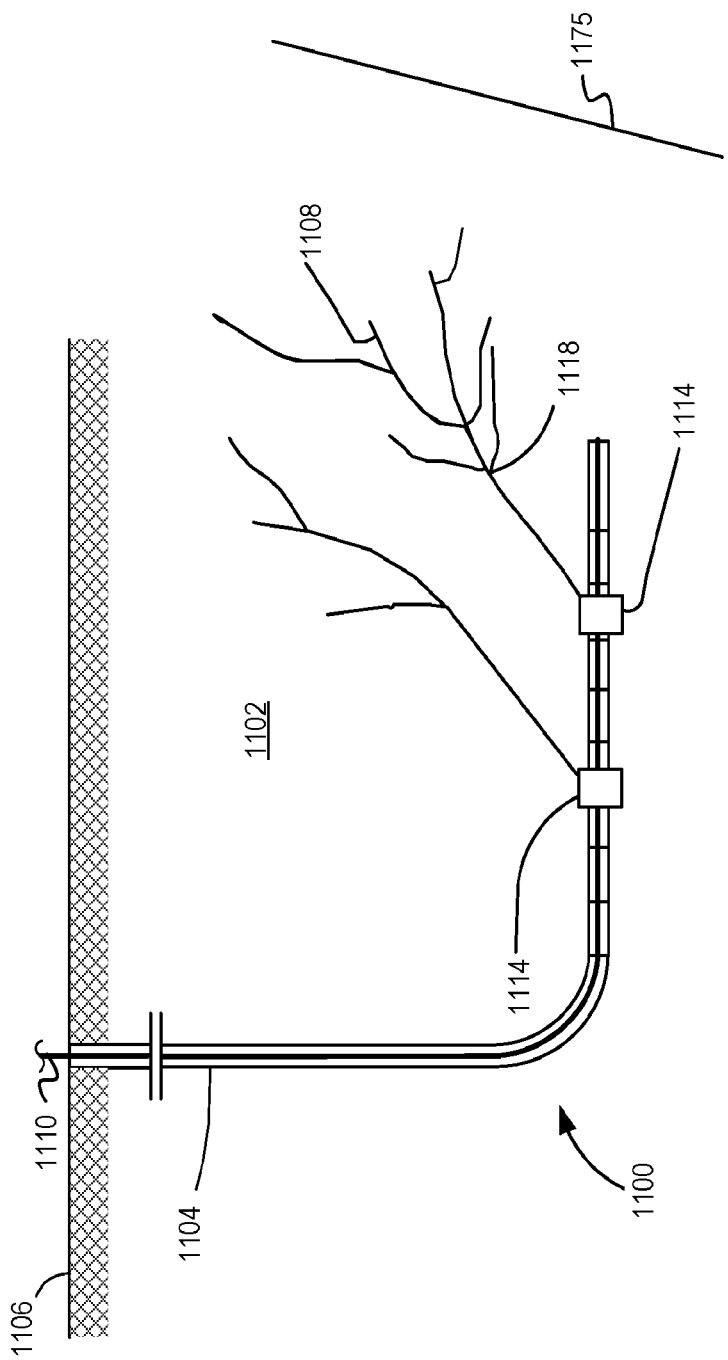
FIG. 11 depicts an example well treatment system near a fault, according to some embodiments.

FIG. 11 depicts an example well treatment system near a fault, according to some embodiments. A wellbore system 1100 depicted in FIG. 11 comprises a wellbore 1104 penetrating at least a portion of a subterranean formation 1102. The wellbore 1104 comprises one or more injection points 1114 where one or more fluids can be injected from the wellbore 1104 into the subterranean formation 1102. The subterranean formation 1102 can comprise pores initially saturated with reservoir fluids (e.g., oil, gas, and/or water). In certain embodiments, the wellbore system 1100 can be treated by the injection of a fracturing fluid, acid, or proppant at one or more injection points 1114 in the wellbore 1104. In certain embodiments, the one or more injection points 1114 can correspond to injection points 1114 in a casing of the wellbore 1104. When fluid enters the subterranean formation 1102 at the injection points 1114, one or more fractures 1118 can be opened. In certain embodiments, a diverting agent can enter the injection point 1114 and restrict the flow of further fluid. In some embodiments, the fracturing fluid can comprise a diverter.

As depicted in FIG. 11, the subterranean formation 1102 comprises at least one fracture network 1108 connected to the wellbore 1104. The fracture network 1108 shown in FIG. 11 contains a number of junctions and fractures 1118. The number of junctions and fractures can vary drastically and/or unpredictably depending on the specific characteristics of the subterranean formation 1102. For example, the fracture network 1108 can comprise on the order of thousands of fractures 1118 to tens of thousands of fractures 1118. In some embodiments, these fractures can be within range of a fault 1175, wherein the position and/or shape of the fault 1175 is determined using operations described herein.

In certain embodiments, an operational parameter can comprise one or more wellbore treatment controls and/or wellbore production controls. These operational parameters can be selected to avoid faults identified in the operations described above. In certain embodiments, the wellbore treatment controls can characterize a treatment operation for a wellbore 1104 penetrating at least a portion of a subterranean formation 1102. In certain embodiments, the operational parameters can include, but are not limited to an amount of acid, fracturing fluid or diverter pumped into the wellbore system 1100, a proppant concentration pumped into the wellbore system 1100, a proppant size used during pumping into the wellbore system 1100, a wellbore pressure at the injection points 1114, a fluid or diverter flow rate at the wellbore inlet 1110, the pressure at the wellbore inlet 1110, a duration of a acidizing/stimulation treatment, a diverter particle diameter, and any combination thereof. In certain embodiments, in response to calculations determining that a fracturing or acidization operation damage or perforate the fault 1175, an operational parameter can be altered to prevent the damage/perforation from occurring. For example, a computer system can determine that a set of operational parameters will result in damaging the fault 1175, and, in response, reduce a fluid flow rate at the surface 1110.

In certain embodiments, the one or more operational parameters can be changed in response to real-time measurements. In some embodiments, real-time measurements can include pressure measurements, flow rate measurements, and seismic measurements. In certain embodiments, real-time measurements can be obtained from one or more wellsite data sources or sensors in acoustic communication with the subterranean formation 1102. Wellsite data sources can include, but are not limited to flow sensors, pressure sensors, thermocouples, and any other suitable measurement apparatus. In certain embodiments, wellsite data sources can be positioned at the surface, on a downhole tool, in the wellbore 1104 or in fractures 1118. Pressure measurements can, for example, be obtained from a pressure sensor at a surface of the wellbore 1104.

Example Wireline System

Figure 12:
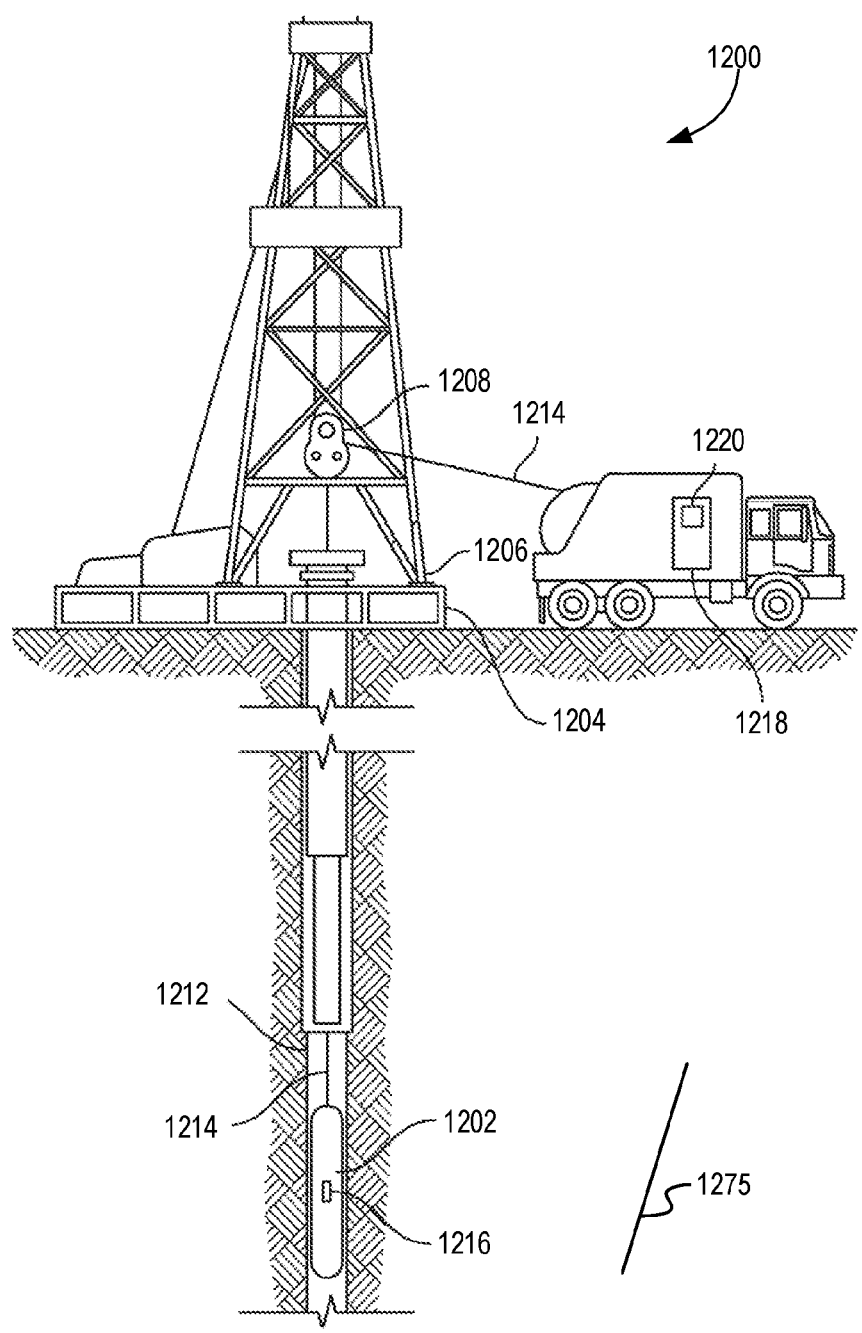
FIG. 12 depicts an example wireline system near a fault, according to some embodiments.

FIG. 12 depicts an example wireline system near a fault, according to some embodiments. The wireline system 1200 comprises a drilling platform 1204 installed over a wellbore or borehole 1212. The drilling platform 1204 is equipped with a derrick 1206 that supports a hoist 1208. The hoist 1208 supports the wireline logging tool body 1202 via the wireline cable 1214. The wireline logging tool body 1202 can be lowered by the wireline cable 1214 into the borehole 1212. Typically, the wireline logging tool body 1202 is lowered to the bottom of the region of interest and subsequently pulled upward at a substantially constant speed.

The wireline logging tool body 1202 is suspended in the wellbore by a wireline cable 1214 that connects the tool to a surface system 1218 (which can also include a display 1220). In some embodiments, the wireline logging tool body 1202 can directly and/or indirectly measure formation features using sensor module 1216, which can be one or more of various types of sensors (e.g., pressure, temperature, radiation, electromagnetic, etc.) to generate measurement data. In some embodiments, the movement of the wireline logging tool body 1202 can be modified as it is lowered in the borehole 1212 to increase the accuracy of measurement data corresponding with the fault 1275, which can be first identified with optimized interpretation parameters using operations described above. For example, the motion of the wireline logging tool body 1202 can be slowed or stopped when the wireline logging tool body 1202 is at the nearest point to the fault 1275 (in the path allowed by the borehole 1212) to increase the accuracy of any measurement data corresponding with the fault 1275.

The measurement data can be communicated to a surface system 1218 via the wireline cable 1214 for storage, processing, and analysis. The wireline cable 1214 can include (or perform functionalities of) a fiber optic cable. The tool can be deployed in the borehole 1212 on coiled tubing, jointed drill pipe, hard-wired drill pipe, or any other suitable deployment technique. In embodiments, the fiber optic cable can include sensors for characterize the pipe containing the optical cable and adjacent pipes over time. The surface system 1218 can be provided with electronic equipment for various types of signal processing.

Example Computing System

Figure 13:
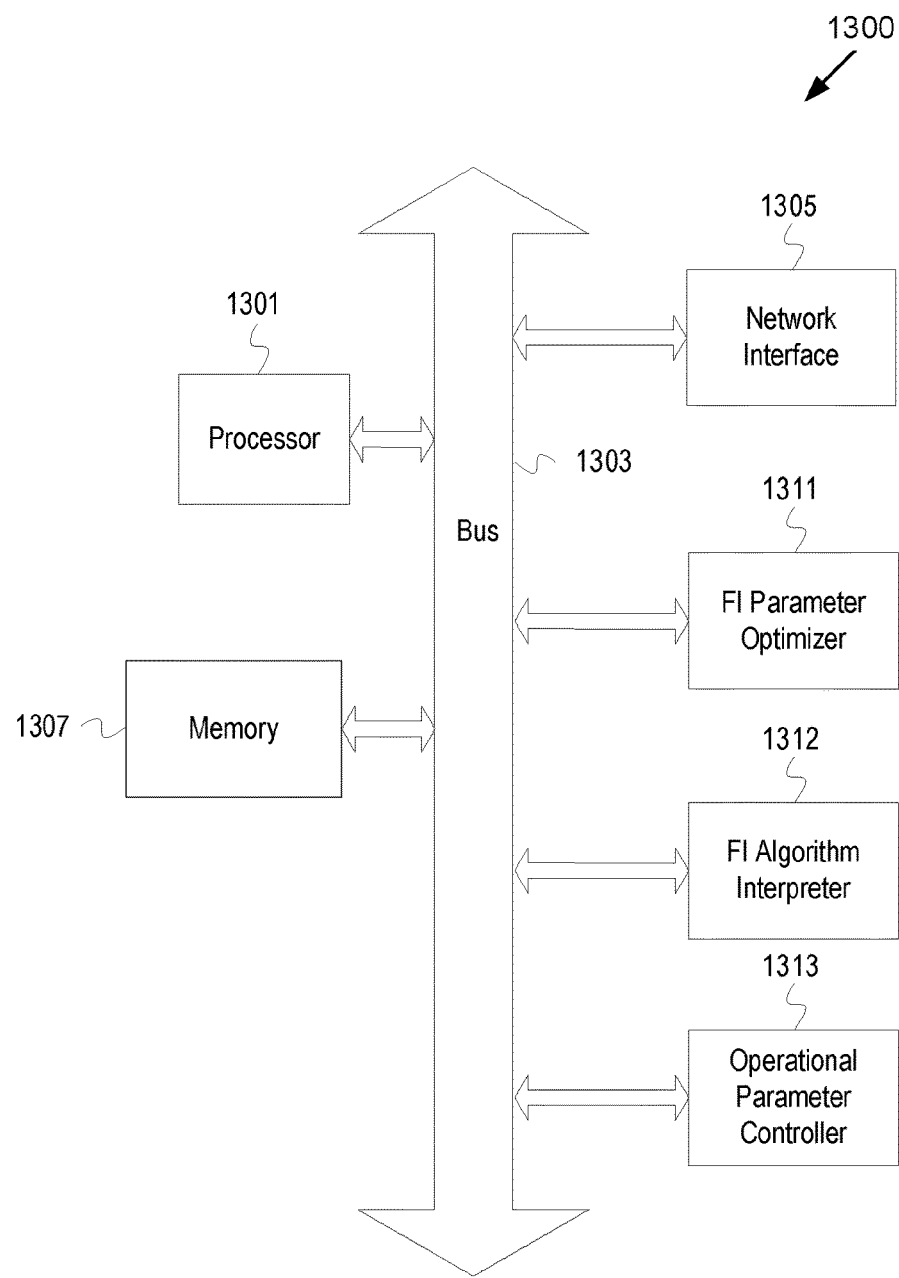
FIG. 13 depicts an example computer device, according to some embodiments.

FIG. 13 depicts an example computer device, according to some embodiments. FIG. 13 depicts an example computer device, according to some embodiments. A computer device 1300 includes a processor 1301 (possibly including multiple processors, multiple cores, multiple nodes, and/or implementing multi-threading, etc.). The computer device 1300 includes a memory 1307. The memory 1307 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1300 also includes a bus 1303 (e.g., PCI, ISA, PCI-Express, HyperTransport® bus, InfiniBand® bus, NuBus, etc.) and a network interface 1305 (e.g., a Fiber Channel interface, an Ethernet interface, an internet small computer system interface, SONET interface, wireless interface, etc.).

In some embodiments, the computer device 1300 includes a FI parameter optimizer 1311. The FI parameter optimizer 1311 can perform one or more operations for optimizing the parameters of a FI algorithm, including determining optimal parameters for a FI algorithm (as described above). The FI Algorithm interpreter 1312 can perform one or more operations for interpreting a seismic dataset to determine position and orientation of discontinuities (as described above). The operational parameter controller 1313 can perform one or more operations for controlling a drilling system, well treatment system, or wireline system. Any one of the previously described functionalities can be partially (or entirely) implemented in hardware and/or on the processor 1301. For example, the functionality can be implemented with an application specific integrated circuit, in logic implemented in the processor 1301, in a co-processor on a peripheral device or card, etc. Further, realizations can include fewer or additional components not illustrated in FIG. 13 (e.g., video cards, audio cards, additional network interfaces, peripheral devices, etc.). The processor 1301 and the network interface 1305 are coupled to the bus 1303. Although illustrated as being coupled to the bus 1303, the memory 1307 can be coupled to the processor 1301. The computer device 1300 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

EMBODIMENTS

Example embodiments include the following:

Embodiment 1

A method comprising: receiving a training selection of a first set of faults located in a first subset of a seismic dataset for a subsurface geologic formation; detecting a second set of faults in the seismic dataset based on fault interpretation operations using a first set of interpretation parameters; determining a difference between the first set of faults and the second set of faults; generating a second set of interpretation parameters for the fault interpretation operations based on the difference between the first set of faults and the second set of faults; and determining a feature of the subsurface geologic formation based on fault interpretation operations using the second set of interpretation parameters.

Embodiment 2

The method of Embodiment 1, wherein the second set of interpretation parameters is determined based on a stochastic optimization.

Embodiment 3

The method of Embodiments 1 or 2, wherein the stochastic optimization is a Bayesian optimization, and wherein the difference between the first set of faults and the second set of faults is based on an Euclidean norm.

Embodiment 4

The method of any of Embodiments 1-3, wherein the seismic dataset is a three-dimensional seismic dataset.

Embodiment 5

The method of any of Embodiments 1-4, further comprising modifying a drilling operation based on the feature of the subsurface geologic formation, wherein modifying the drilling operation comprises at least one of changing a drilling direction, reducing rotational speed of a drill bit, and stopping rotation of the drill bit.

Embodiment 6

The method of any of Embodiments 1-5, further comprising: receiving a second training selection of a third set of faults located in a second subset of the seismic dataset for the subsurface geologic formation, wherein the first subset of the seismic dataset and second subset of the seismic dataset are two-dimensional and orthogonal to each other; detecting a fourth set of faults in the seismic dataset based on the fault interpretation operations using a third set of interpretation parameters; determining a difference between the third set of faults and the fourth set of faults; generating a fourth set of interpretation parameters for the fault interpretation operations based on the difference; and determining the feature of the subsurface geologic formation based on fault interpretation operations using the fourth set of interpretation parameters.

Embodiment 7

The method of any of Embodiments 1-6, further comprising determining whether the difference between the first set of faults and the second set of faults is less than a threshold, wherein generating the second set of interpretation parameters is based on determining that the difference between the first set of faults and the second set of faults is less than the threshold.

Embodiment 8

One or more non-transitory machine-readable media comprising program code, the program code to: receive a training selection of a first set of faults located in a first subset of a seismic dataset for a subsurface geologic formation; detect a second set of faults in the seismic dataset based on fault interpretation operations using a first set of interpretation parameters; determine a difference between the first set of faults and the second set of faults; generate a second set of interpretation parameters for the fault interpretation operations based on the difference between the first set of faults and the second set of faults; and determine a feature of the subsurface geologic formation based on fault interpretation operations using the second set of interpretation parameters.

Embodiment 9

The one or more non-transitory machine-readable media of Embodiment 8, wherein the second set of interpretation parameters is determined based on stochastic optimization.

Embodiment 10

The one or more non-transitory machine-readable media of Embodiments 8 or 9, wherein the stochastic optimization is a Bayesian optimization, and wherein the difference between the first set of faults and the second set of faults is based on an Euclidean norm.

Embodiment 11

The one or more non-transitory machine-readable media of any of Embodiments 8-10, wherein the seismic dataset is a three-dimensional seismic dataset.

Embodiment 12

The one or more non-transitory machine-readable media of any of Embodiments 8-11, further comprising program code to modify a drilling operation based on the feature of the subsurface geologic formation, wherein modifying the drilling operation comprises at least one of changing a drilling direction, reducing rotational speed of a drill bit, and stopping rotation of the drill bit.

Embodiment 13

The one or more non-transitory machine-readable media of any of Embodiments 8-12, further comprising program code to: receive a second training selection of a third set of faults located in a second subset of the seismic dataset for the subsurface geologic formation, wherein the first subset of the seismic dataset and second subset of the seismic dataset are two-dimensional and orthogonal to each other; detect a fourth set of faults in the seismic dataset based on the fault interpretation operations using a third set of interpretation parameters; determine a difference between the third set of faults and the fourth set of faults; generate a fourth set of interpretation parameters for the fault interpretation operations based on the difference; and determine the feature of the subsurface geologic formation based on fault interpretation operations using the fourth set of interpretation parameters.

Embodiment 14

The one or more non-transitory machine-readable media of any of Embodiments 8-13, further comprising program code to determine whether the difference between the first set of faults and the second set of faults is less than a threshold, wherein generating the second set of interpretation parameters is based on determining that the difference between the first set of faults and the second set of faults is less than the threshold.

Embodiment 15

A system comprising: a drill string having a drill bit to drill a wellbore; a processor; and a machine-readable medium having program code executable by the processor to cause the processor to: receive a training selection of a first set of faults located in a first subset of a seismic dataset for a subsurface geologic formation; detect a second set of faults in the seismic dataset based on fault interpretation operations using a first set of interpretation parameters; determine a difference between the first set of faults and the second set of faults; generate a second set of interpretation parameters for the fault interpretation operations based on the difference between the first set of faults and the second set of faults; and determine a feature of the subsurface geologic formation based on fault interpretation operations using the second set of interpretation parameters.

Embodiment 16

The system of Embodiment 15, wherein the second set of interpretation parameters is determined based on stochastic optimization.

Embodiment 17

The system of Embodiments 15 or 16, wherein the stochastic optimization is a Bayesian optimization, and wherein the difference between the first set of faults and the second set of faults is based on an Euclidean norm.

Embodiment 18

The system of any of Embodiments 15-17, wherein the seismic dataset is a three-dimensional seismic dataset.

Embodiment 19

The system of any of Embodiments 15-18, wherein the machine-readable medium comprises program code to modify a drilling operation based on the feature of the subsurface geologic formation, wherein modifying the drilling operation comprises at least one of changing a drilling direction, reducing rotational speed of the drill bit, and stopping rotation of the drill bit.

Embodiment 20

The system of any of Embodiments 15-19, wherein the machine-readable medium comprises program code to: receive a second training selection of a third set of faults located in a second subset of the seismic dataset for the subsurface geologic formation, wherein the first subset of the seismic dataset and second subset of the seismic dataset are two-dimensional and orthogonal to each other; detect, by the processor, a fourth set of faults in the seismic dataset based on the fault interpretation operations using a third set of interpretation parameters; determine a difference between the third set of faults and the fourth set of faults; generate a fourth set of interpretation parameters for the fault interpretation operations based on the difference; and determine the feature of the subsurface geologic formation based on fault interpretation operations using the fourth set of interpretation parameters.

What is claimed is:

1. A method comprising:
obtaining a first labeled seismic dataset for a subsurface geologic formation;
iteratively determining fault interpretation parameters for a fault interpretation algorithm to tune the fault interpretation algorithm, wherein each iteration comprises,
obtaining a second labeled seismic dataset from running the fault interpretation algorithm on an unlabeled seismic dataset for the subsurface geologic formation using fault interpretation parameters determined for the current iteration;
determining a quantified difference between the first labeled seismic dataset and the second labeled seismic dataset of the current iteration; and
based, at least in part, on the quantified difference between the first labeled seismic dataset and the second labeled seismic dataset of the current iteration, determining fault interpretation parameters for a next iteration with stochastic optimization.

2. The method of claim 1, wherein the stochastic optimization is a Bayesian optimization.

3. The method of claim 1, wherein the seismic dataset is a three-dimensional seismic dataset.

4. The method of claim 1, wherein iteratively determining the fault interpretation parameters for the fault interpretation algorithm further comprises iteratively determining the fault interpretation parameters with the stochastic optimization until the quantified difference is minimized.

5. The method of claim 1 further comprising configuring a second fault interpretation algorithm with the determined fault interpretation parameters corresponding to a minimized quantified difference.

6. The method of claim 1 further comprising running the fault interpretation algorithm on a second unlabeled seismic dataset with the fault interpretation parameters determined in the iteration corresponding to a minimal one of the quantified differences.

7. The method of claim 1, wherein the quantified difference is based on an at least one of a Euclidean norm, a Manhattan norm, and a Minkowski norm.

8. The method of claim 1, wherein iteratively determining the fault interpretation parameters for the fault interpretation algorithm comprises running the fault interpretation until reaching an iteration step threshold.

9. One or more non-transitory machine-readable media comprising program code, the program code to:
obtain a labeled version of a first subset of a seismic dataset for a subsurface geologic formation;
iteratively determine fault interpretation parameters to tune a fault interpretation algorithm, wherein each iteration comprises,
running the fault interpretation algorithm on the first subset of the seismic dataset with fault interpretation parameters for a current iteration to obtain fault predictions of the current iteration;

determine a quantified difference between the labeled version of the first subset of the seismic dataset and the fault predictions of the current iteration;

determine fault interpretation parameters for a next iteration with stochastic optimization based on the quantified difference; and with the tuned fault interpretation algorithm, obtain fault predictions for at least a second subset of the seismic dataset of the subsurface geologic formation.

10. The one or more non-transitory machine-readable media of claim 9, wherein the stochastic optimization is a Bayesian optimization.

11. The one or more non-transitory machine-readable media of claim 9, wherein the seismic dataset is a three-dimensional seismic dataset.

12. The one or more non-transitory machine-readable media of claim 9, further comprising program code to iteratively determine the fault interpretation parameters for the fault interpretation algorithm with the stochastic optimization until the quantified difference is minimized.

13. The one or more non-transitory machine-readable media of claim 9, wherein the quantified difference is based on at least one of a Euclidean norm, a Manhattan norm, and a Minkowski norm.

14. The one or more non-transitory machine-readable media of claim 9, wherein the program code to iteratively determine the fault interpretation parameters for the fault interpretation algorithm with the stochastic optimization comprises the program code to iteratively determine the fault interpretation parameters until an iteration step threshold is reached.

15. A system comprising:
a processor; and
a machine-readable medium having program code executable by the processor to cause the processor to:

obtain a labeled version of a first subset of a seismic dataset for a subsurface geologic formation;

iteratively determine fault interpretation parameters to tune a fault interpretation algorithm, wherein each iteration comprises, running the fault interpretation algorithm on the first subset of the seismic dataset with fault interpretation parameters for a current iteration to obtain fault predictions of the current iteration;

determine a quantified difference between the labeled version of the first subset of the seismic dataset and the fault predictions of the current iteration;

determine fault interpretation parameters for a next iteration with stochastic optimization based on the quantified difference; and with the tuned fault interpretation algorithm, obtain fault predictions for at least a second subset of the seismic dataset of the subsurface geologic.

16. The system of claim 15, wherein the stochastic optimization is a Bayesian optimization.

17. The system of claim 15, wherein the seismic dataset is a three-dimensional seismic dataset.

18. The system of claim 15, wherein the quantified difference is based on an at least one of a Euclidean norm, a Manhattan norm, and a Minkowski norm.

19. The system of claim 15, further comprising program code to iteratively determine the fault interpretation parameters for the fault interpretation algorithm with the stochastic optimization until the quantified difference is minimized.

20. The system of claim 15, wherein iteratively determining the fault interpretation parameters for the fault interpretation algorithm further comprises the program code to iteratively determine the fault interpretation parameters with stochastic optimization until an iteration step threshold is reached.

* * * * *